July 28, 1942.  F. G. POHL  2,291,058
PORTABLE MACHINE FOR CUTTING MARBLE, CERAMICS, ETC
Filed Oct. 30, 1941   3 Sheets-Sheet 1

INVENTOR.
FRANK G. POHL
BY
Richards & Geier
ATTORNEYS

July 28, 1942.  F. G. POHL  2,291,058
PORTABLE MACHINE FOR CUTTING MARBLE, CERAMICS, ETC
Filed Oct. 30, 1941  3 Sheets-Sheet 2

INVENTOR.
FRANK G. POHL
BY
Richards & Geier
ATTORNEYS

July 28, 1942.  F. G. POHL  2,291,058
PORTABLE MACHINE FOR CUTTING MARBLE, CERAMICS, ETC
Filed Oct. 30, 1941  3 Sheets-Sheet 3

INVENTOR.
FRANK G. POHL
BY
Richards & Geier
ATTORNEYS

Patented July 28, 1942

2,291,058

UNITED STATES PATENT OFFICE 2,291,058

PORTABLE MACHINE FOR CUTTING MARBLE, CERAMICS, ETC.

Frank G. Pohl, Flemington, N. J.

Application October 30, 1941, Serial No. 417,058

8 Claims. (Cl. 51—176)

This invention relates to a marble cutting machine and refers more particularly to a portable machine for cutting marble, slate, tile and the like.

An object of the present invention is the provision of a dual table machine which can be easily adjusted for cutting small or large slabs of marble or tile and which can be used as a bench cutter or a floor cutter.

Another object is the provision of a cutting machine which is movable on tracks to cut marble slabs of any length, thereby saving the cost of hauling to and from marble shops during alteration work.

A further object is the provision of a marble cutting machine which can be moved easily and which is light in weight and compact in construction.

Yet another object is the provision of a single marble cutting machine having an upper general purpose saw table for cutting tile or any other material which may be cut dry, and a lower table for cutting heavy slabs requiring water on the wheel.

Other objects of the present invention will become apparent in the course of the following specification.

The objects of the present invention may be realized through the provision of a marble cutting machine having a track and a roller-carrying frame mounted upon the track with a three point bearing support and carrying a drive for the cutting wheel and supporting means which carry the cutting wheel and its drive and which may be shifted in relation to the frame to adjust the position of the cutting wheel. The cutting wheel is so mounted that it can be swung in relation to the frame to an upper position or a lower position. In the upper position, the cutting is done on a table carried by the frame. In the lower position, the cutting is done on the floor or on a lower table, and then the upper table serves as a support for a water reservoir connected with suitable means supplying water to the cutting wheel.

The invention will appear more clearly from the following detailed description when taken in connection with the accompanying drawings showing, by way of example, a preferred embodiment of the inventive idea.

In the drawings:

Figure 4 is a horizontal section through the machine along the line 4—4 of Figure 1.

Figure 5 is a fragmentary front view illustrating the water supplying attachment.

Figure 1:
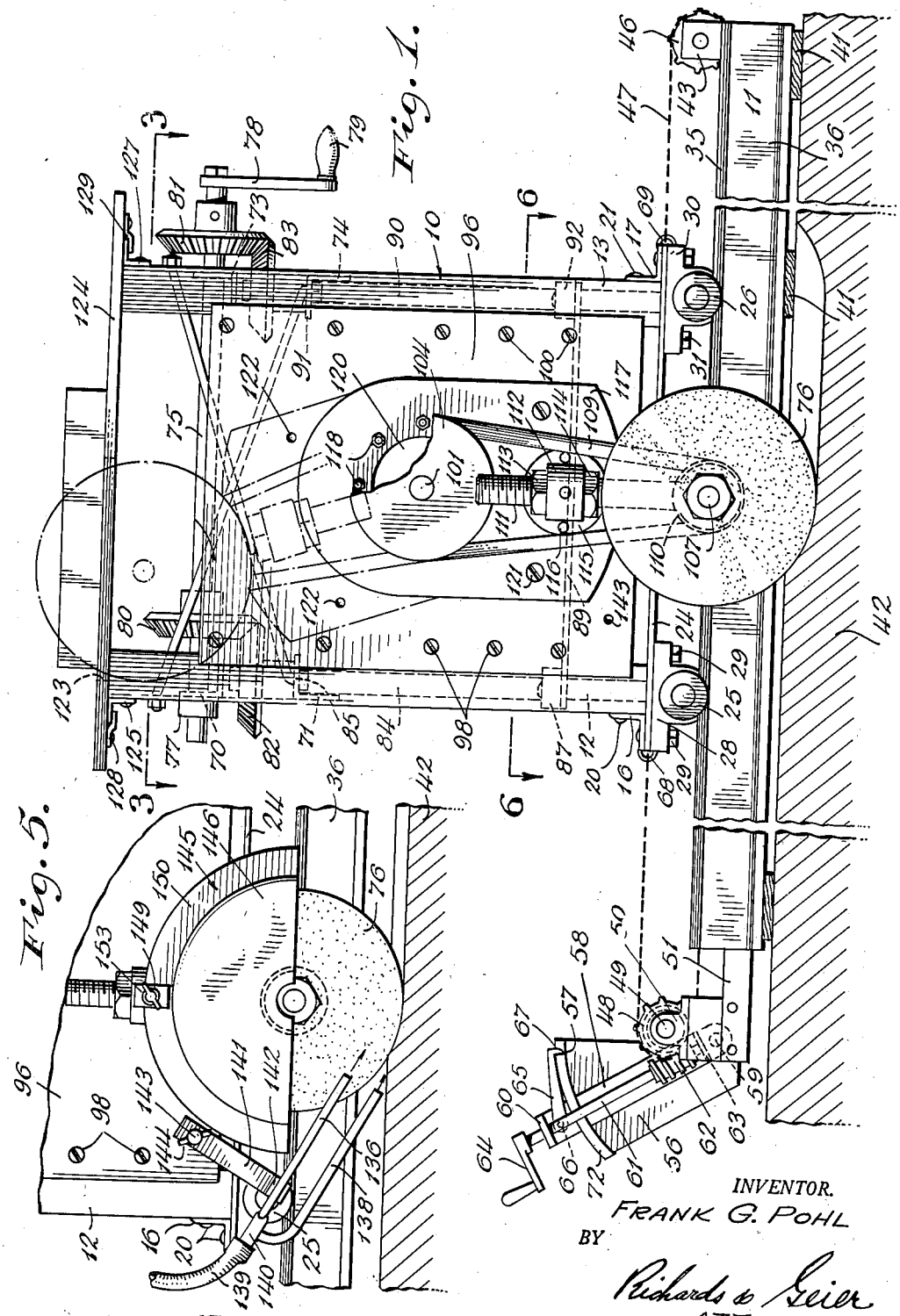
Figure 1 shows a marble cutting machine constructed in accordance with the principles of the present invention, in front elevation, some parts being broken off, with the water supplying attachment removed.

The marble cutting machine shown in the drawings includes a frame 10 carried by a track 11.

The frame 10 comprises four angular posts or uprights 12, 13, 14 and 15 (Fig. 3), the lower ends of which are respectively mounted by angle irons 16 to 19 and rivets 20 to 23 upon a lower platform 24.

The platform 24 is supported upon three wheels 25, 26 and 27. Two wheels 25 and 26 are situated upon the front side of the frame 10 at opposite ends thereof, while the wheel 27 is situated in the middle of the frame upon the rear side thereof. The wheel 25 is carried by a pillow block 28 attached to the underside of the platform 24 by bolts 29. A bearing 30 and bolts 31 connect the wheel 26 to the platform 24, while the wheel 27 is supported by a pillow block 32 attached by bolts 33 to the platform 24.

The front wheels 25 and 26 are provided with V-shaped grooves 34 which run upon the sharp upper edge 35 of a rail 36. The rear wheel 27 has a flat groove 37 engaging the flat upper edge 38 of a second rail 39 (Fig. 2). The two rails 36 and 39 are joined by tie rods 40 and are carried by planks 41 upon a floor 42 (Fig. 1) which may consist of the workpiece to be cut.

Figure 3:
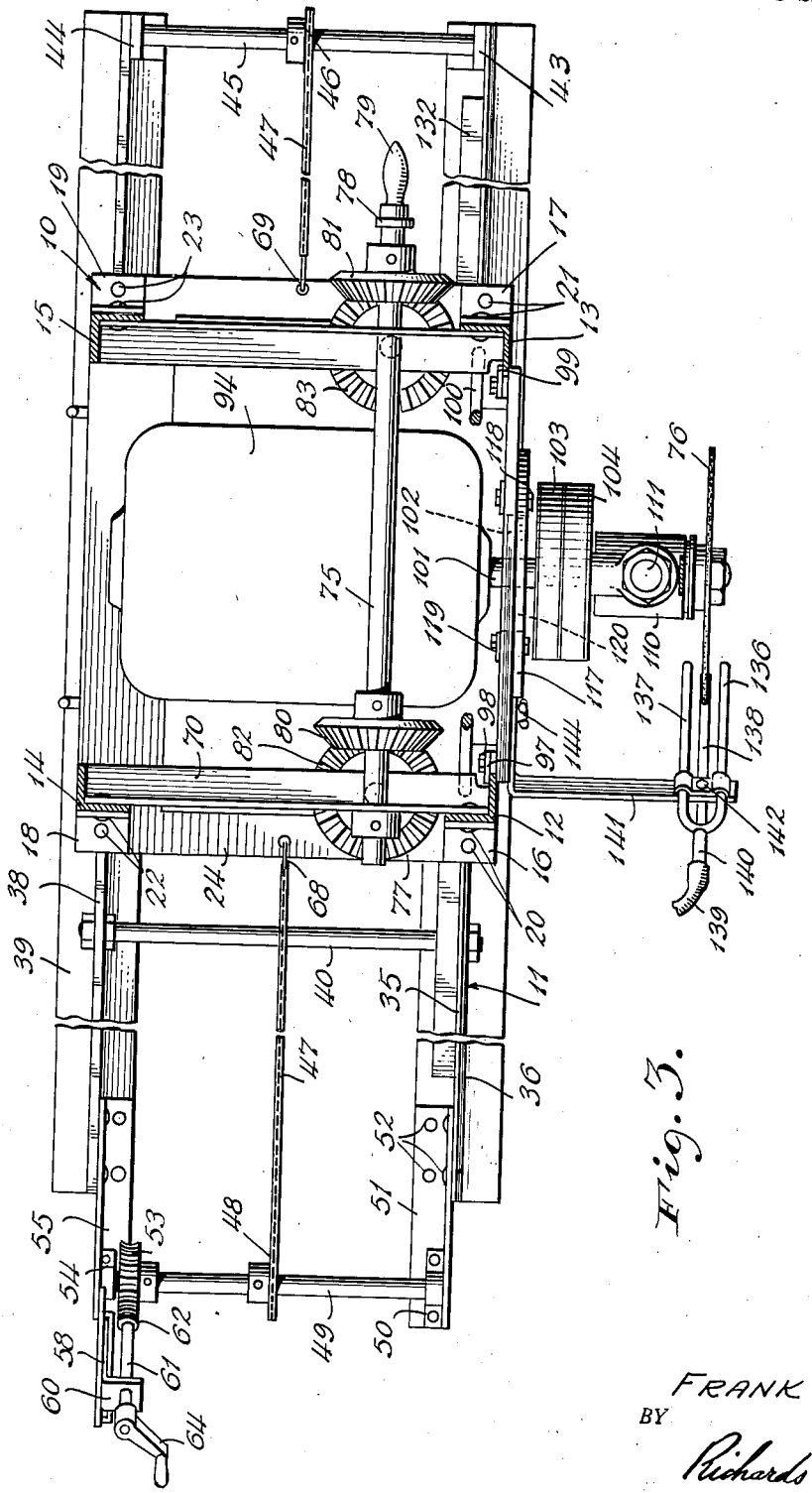
Figure 3 is a horizontal section through the machine along the line 3—3 of Figure 1, the illustrated machine being provided with the water supplying attachment.

Two adjacent ends of the rails 36 and 39 carry brackets 43 and 44, respectively (Fig. 3). A shaft 45 has two ends mounted in the brackets 43 and 44 and carries a sprocket wheel 46 which is keyed upon the shaft 45. A chain 47 extends around the sprocket wheel 46.

The chain 47 also extends around a sprocket wheel 48 keyed upon a shaft 49 which extends close to the opposite ends of the rails 36 and 39. One end of the shaft 49 is mounted in a bracket 50 which is carried by an elongated support 51 connected by rivets 52 with the end of the rail 36. The opposite end of the shaft 49 carries a worm gear 53 and is mounted in a bracket 54 which is connected by a support 55 with an end of the rail 39.

Figure 2:
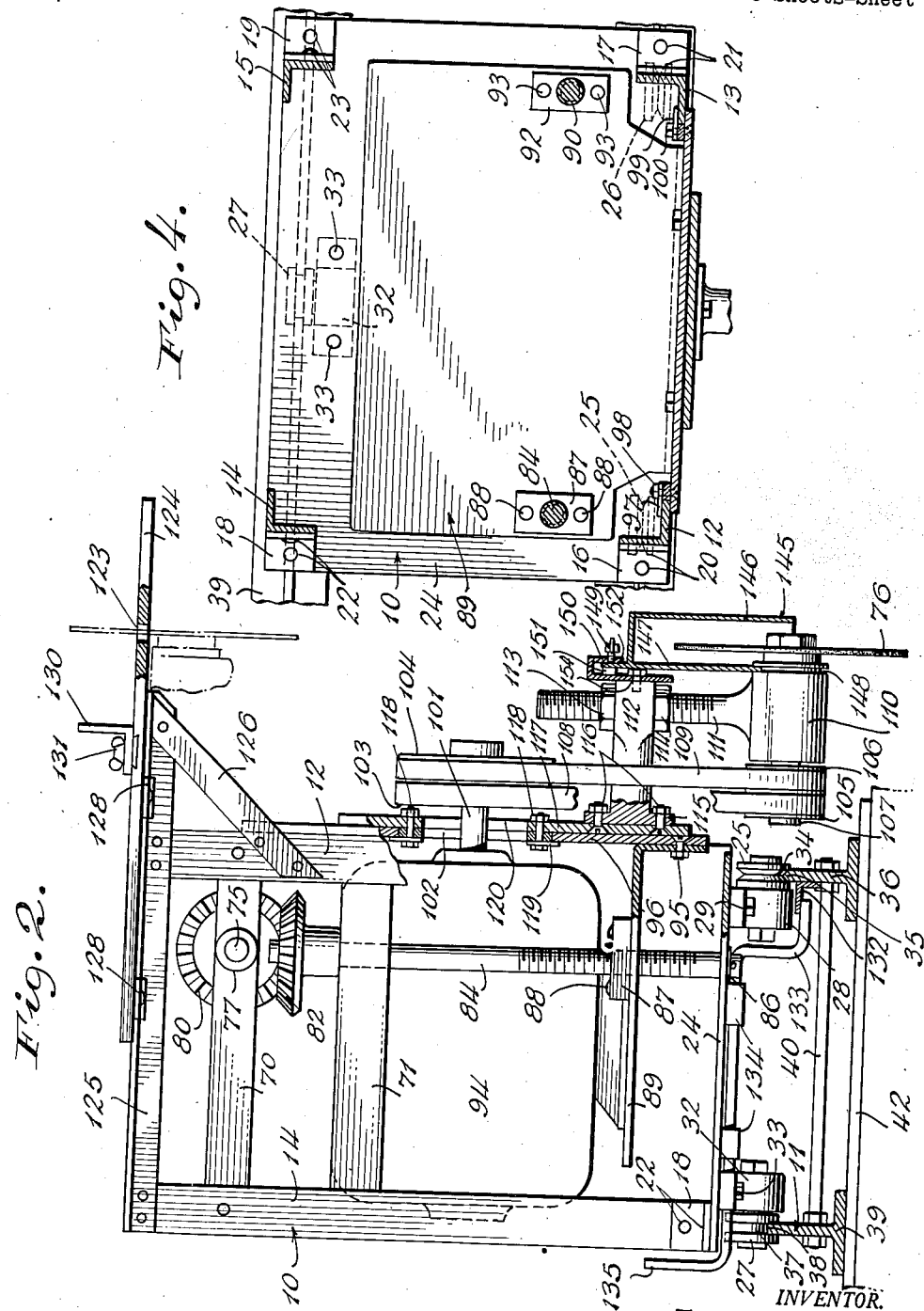
Figure 2 shows the machine in side elevation and also illustrates the water fender attachment.

As shown in Figures 1 and 3, the support 55 is connected with a curved extension piece 56 having a guide 72 provided with a retaining edge 57. An elongated support 58 is pivotally connected at 59 with the bracket 54. The support 58 has a guiding flange 60 for a worm shaft 61 which is integral with a worm 62 and which is supported upon a projection 63 of the support 58. The worm 62 is adapted to mesh with the worm gear 53 which is keyed upon the shaft 49. The upper end of the worm shaft 61 is firmly connected with a hand-operated crank 64. A lever 65 is pivotally mounted at 66 upon the support 58. The free end of the lever 65 has the form of a hook 67 adapted to engage the edge 57 of the guide 72. The support 58 extends between the guide 72.

The chain 47 extends below the frame 10 and over the sprocket wheels 46 and 48. One end of the chain 47 is attached by the usual clamp 68 to a side edge of the platform 24. A clamp 69 connects the other end of the chain 47 to the opposite side edge of the platform 24.

It is apparent that when the worm 62 is in engagement with the worm gear 53, the frame 10 may be moved upon the rails 36 and 39 by turning the crank 64. On the other hand, the frame 10 may be moved by hand as soon as the worm 62 is disengaged by releasing the hook 67.

The posts 12 and 14 are connected with each other by transverse bars 70 and 71 (Fig. 2). Similar bars 73 and 74 are situated at the opposite side of the frame and connect the posts 13 and 15 (Fig. 1).

The bars 70 and 73 serve as supports for a transverse shaft 75 which extends through the bars and which constitutes a part of the mechanism for adjusting the position of a cutting wheel 76 which is made of silicon carbide or any other suitable material. That end of the shaft 75 which projects out of the bar 70, carries a collar 77. The opposite end of the shaft 75, which projects out of the bar 73, carries a crank 78 provided with a handle 79.

A bevel gear 80 is firmly mounted upon the shaft 75 and is situated within the frame 10. Another bevel gear 81 which is also firmly mounted upon the shaft 75, is situated outside of the frame 10, between the crank 78 and the bar 73. The bevel gear 80 meshes with a bevel gear 82 while the bevel gear 81 meshes with a bevel gear 83.

The bevel gear 82 is firmly connected with a vertical shaft 84 and is carried by a horizontal extension 85 of the bar 71. The lower end of the shaft 84 extends through the lower platform 24 and carries a washer or ring 86 (Fig. 2). The shaft 84 is threaded and its screw threads mesh with a nut 87 which is attached by rivets 88 to a movable platform 89.

The bevel gear 83 (Fig. 1) is firmly connected with a vertical threaded shaft 90 and is carried by a horizontal extension 91 of the bar 74. A nut 92 is mounted upon and meshes with the shaft 90. The nut 92 is attached by rivets 93 (Fig. 4) to the movable platform 89. The lower end of the shaft 90 extends through the platform 24.

The movable platform 89 carries an electromotor 94 (Fig. 2) which is firmly attached to the platform 89 and is used for driving the cutting wheel 76. The platform 89 has a downwardly bent portion which is connected by bolts 95 with a front plate 96.

As shown in Figures 1 and 3, the front plate 96 overlaps the adjacent edges of the posts 12 and 13. A vertical elongated guide 97 is in contact with the opposite side of the post 12 and is connected with the plate 96 by bolts 98. The guide 97 and the adjacent edge of the plate 96 form a groove which receives an edge of the post 12, so that the plate 96 can slide up and down upon the post 12.

The post 13 extends into a similar groove formed by the adjacent edge of the plate 96 and a guide 99 connected to the plate 96 by bolts 100.

The shaft 101 of the motor 94 extends through a circular opening 102 provided in the plate 96. The cutting disc 76 is driven from the shaft 101 by means of a V-belt drive which includes pulleys 103 and 104 keyed upon the shaft 101, pulleys 105 and 106 keyed upon the disc shaft 107, a belt 108 extending over the pulleys 103 and 105, and a belt 109 extending over the pulleys 104 and 106 (Fig. 2).

The disc shaft 107 is carried by a bearing 110 which is integral with an upwardly extending threaded shaft 111. The shaft 111 extends through a bracket 112 and carries nuts 113 and 114 which engage the bracket 112, so that the latter carries the shaft 111. This arrangement serves as a convenient belt tightener.

The bracket 112 is integral with a flange 115 which is attached by bolts 116 with a swingable plate 117. The plate 117 is connected by circularly disposed bolts 118 with an annular guide 119 extending over the edges of the opening 102 formed in the plate 96. Thus the plate 117 which is provided with an opening 120 in alinement with the opening 102, is mounted within the plate 96 and can swing along with the guide 119 in relation to the plate 96.

The cutting wheel 76, the bearing 110 and the bracket 112 swing along with the plate 117. The plate 117 is maintained in its lower position, shown in full lines in Figure 1, by two screws 121 which extend through openings provided in the plate 117 and which can be screwed into suitably located threaded openings provided in the front plate 96. In this lower position, the cutting wheel 76 extends below the frame 10 and may be used for cutting a workpiece 42 which carries the machine.

After the screws 121 have been unscrewed, the plate 117 and the cutting wheel 76 connected therewith may be swung into an upper position indicated by broken lines in Figure 1. The plate 117 is secured in its upper position by screwing the screws 121, which extend through openings formed in the plate 117, into suitably located threaded openings 122 provided in the front plate 96.

In its upper position, the cutting wheel 76 extends above the frame 10 and through a slot 123 formed in an upper table 124. The upper ends of the posts 12 and 14 are connected with each other by an angular transverse bar 125 having an end which extends in front of the frame 10 and which is additionally supported by an inclined strut 126 affixed to the post 12 (Fig. 2). A transverse bar 127 (Fig. 1) which is attached to the posts 13 and 15, is of similar structure. The table 124 carries clamps 128 which are connected to the bar 125 and clamps 129 which are connected to the bar 127. Thus the table 124, which extends considerably in front of the frame 10, is firmly connected to the frame.

The table 124 carries an angular guide 130 for a workpiece placed upon the table. The guide 130 is movable within a groove provided in the table 124; its angular position may be adjusted by a winged nut 131.

When the wheel 76 is cutting in its lower position, the pressure exerted by it upon the workpiece may raise the wheels 25 and 26 off their rail 36. To prevent this, the rail 36 is connected with an inwardly extending flange 132 (Fig. 2) which may be engaged from beneath by the bent end of a lever 133. The lever 133 is carried by supports 134 attached to the platform 24. An upwardly extending end 135 of the lever 133 may be used as a handle to shift the lever 133 toward or away from the flange 132.

The wheel 76 cuts dry in its upper position, while it is supplied with water or other liquid from three nozzles 136, 137 and 138 (Figs. 3 and 5) when cutting in its lower position. A water container (not shown) is preferably placed upon the upper table 124 and is connected by a rubber tube or hose 139 with a pipe 140 communicating with the three nozzles. The nozzles are supported at suitable positions close to the cutting wheel 76 by an angular bracket 141 carrying a clamp 142 for holding the nozzles. The bracket 141 is mounted at 143 upon the front plate 96 and its position may be adjusted by a winged nut 144.

A splash pan 145 (Figs. 2 and 5) has a front wall 146 covering the upper half of the wheel 76, and a rear wall 147 provided with a lower semi-circular edge which slides in a groove 148 of the bearing 110. Thus the bearing 110 serves as a support for the splash pan 145 which may be turned about the bearing 110.

The splash pan 145 is held in a selected position by a screw 149 which presses a semi-annular projecting extension 150 of the rear wall 147 against a butt 151. The screw 149 is carried by a front portion 152 of a bracket 153 which carries the member 151. The bracket 153 is attached to the bracket 112 by a bolt 154.

As already stated, the cutting wheel 76 may be swung from its lower position shown in full lines in Figure 1 to its upper position shown therein in broken lines, or vice-versa. In the course of this swinging movement of the wheel 76, the plate 117 along with its guide 119 turn upon the circular edge of the opening 102 provided in the plate 96. The bracket 112, the shaft 111, the bearing 110, the pulleys 105 and 106 and the disc shaft 107 move along with the plate 117 and the disc 76. The plate 117 is fixed in its lower position by screws 121 which are screwed into suitably located openings provided in the plate 96. Openings 122 receive these screws when the plate 117 is to be maintained in its upper position.

The cutting wheel 76 may be raised or lowered, and its position in relation to a workpiece may be conveniently adjusted by turning the crank 78. The shaft 75 and the bevel gears 80 and 81 rotate along with the crank, so that the bevel gears 82 and 83 and the vertical shafts 84 and 90 are rotated. Since the nuts 87 and 92 which are firmly connected to the platform 89, mesh with the screw threads of the shafts 84 and 90, a rotation of these shafts will cause the platform 89 to move up or down. The front plate 96 is firmly connected with the platform 89, so that it will move along with the platform, while the guides 97 and 99 slide upon the edges of the parts 12 and 13. The motor 94 carried by the platform 89 moves along with the platform, while the plate 117 mounted in the plate 96 and the parts connecting the cutting wheel 76 with the plate 117 move along with the plate 96.

In the lower position of the wheel 76 the cutting is done on a lower table or on the floor, whichever is more suitable as far as the location of a workpiece for a particular operation is concerned. Water may be supplied through a container (not shown) which is placed upon the table 124 and which is connected with the hose 139 transmitting the water through the three nozzles 136, 137 and 138 to the wheel 76. The operator is protected from being splashed by the adjustable splash pan 145.

In the upper position of the wheel 76, which is shown by broken lines in Figure 1, the cutting is done on the table 124. The wheel 76 extends through the slot 123 provided in the table 124 and the workpiece may be guided along the adjustably mounted guide 130.

When the machine is used as a general purpose saw table, the clamps 68 and 69 can be removed, thereby separating the frame 10 from the chain 47 and the chain drive. The machine may be then placed upon a floor or work bench and used without the rails 36 and 39. The machine will then rest on pillow blocks 28 and 32 which extend slightly below the wheels.

In general, it is apparent that the specific illustrations shown above have been given by way of illustration and not by way of limitation and that the structures above described are subject to other variations and modifications without departing from the scope or intent of the invention. All of such variations and modifications are to be included within the scope of the present invention.

What is claimed is:

1. In a cutting machine, in combination, a frame, means supporting a cutting wheel for swinging said cutting wheel from an upper position to a lower position, and vice versa, said cutting wheel projecting beyond said frame and being capable of cutting in both said positions, means adjustably mounted in said frame and carrying said wheel-supporting means for finely adjusting the position of said wheel, and means connected with said frame for moving the same.

2. In a cutting machine, a plate, a frame constituting a vertical guide for said plate, another plate swingably mounted in the first-mentioned plate, means connected with said other plate for supporting a cutting wheel, whereby said cutting wheel may be swung from an upper working position to a lower working position, and vice versa, and means carried by said frame and connected with the first-mentioned plate for adjusting the position thereof relatively to said frame.

3. In a cutting machine, a frame, an upper table carried by said frame and having a slot formed therein for a cutting wheel in the upper cutting position of the latter, rollers carried by said frame, rails supporting said rollers, means carrying said cutting wheel and turnable to swing said cutting wheel from said upper position to a lower cutting position wherein said cutting wheel extends below said rails, and vice versa, means adjustably mounted in said frame and carrying said wheel-carrying means for finely adjusting the position of said wheel, and means connected with said frame for moving it upon said rails.

4. In a cutting machine, posts, a plate guided vertically in some of said posts, a horizontal plate firmly connected with the first-mentioned plate, a motor carried by the second-mentioned plate and having a motor shaft extending through an opening formed in the first-mentioned plate, a driving pulley carried by said motor shaft, a third plate swingably mounted in the first-mentioned plate, a bracket firmly connected with the third-mentioned plate, a shaft for a cutting wheel, a driven pulley carried by said wheel shaft and being driven by the first-mentioned pulley, a bearing connected with said bracket and carrying said wheel shaft, whereby the shaft carrying the cutting wheel may be swung from an upper cutting position to a lower cutting position, and vice versa, and means connected with the second-mentioned plate for shifting the same and thereby finely adjusting the position of said cutting wheel.

5. In a cutting machine, a frame comprising posts and bars between some of said posts, a plate guided vertically in some of said posts, a horizontal plate firmly connected with the first-mentioned plate, a cutting-wheel drive carried by the second-mentioned plate, a third plate swingably mounted in the first-mentioned plate, a cutting-wheel support carried by the third-mentioned plate, a nut firmly connected with the second-mentioned plate, a shaft meshing with said nut, and a gear drive operatively connected with said shaft.

6. In a cutting machine, in combination, a frame, means supporting a cutting wheel for swinging said cutting wheel from an upper position to a lower position, and vice versa, said cutting wheel projecting beyond said frame and being capable of cutting in both said positions, means adjustably mounted in said frame and carrying said wheel-supporting means for finely adjusting the position of said wheel, a flat-topped rail, a sharp-topped rail, two rollers having V-shaped grooves engaging said sharp-topped rail, a single roller having a flat-bottomed groove engaging said flat-topped rail, bearings carrying said rollers and carried by said frame, said cutting wheel extending close to the sharp-topped rail in the lower position of the wheel, a flange carried by said sharp-topped rail, and a locking lever carried by said frame and adapted to engage said flange to prevent said frame from being raised off the rails.

7. In a cutting machine, in combination, a frame, means supporting a cutting wheel for swinging said cutting wheel from an upper position to a lower position, and vice versa, said cutting wheel projecting beyond said frame and being capable of cutting in both said positions, means adjustably mounted in said frame and carrying said wheel-supporting means for finely adjusting the position of said wheel, rails carrying said frame, a sprocket wheel, a chain connected to said frame and engaging said sprocket wheel, a worm gear rotatable along with said sprocket wheel, a worm adapted to drive said worm gear, and means supporting said worm and pivotally connected with one of said rails to maintain said worm in engagement with said worm gear and to interrupt this engagement.

8. In a cutting machine, in combination, a frame, means supporting a cutting wheel for swinging said cutting wheel from an upper position to a lower position, and vice versa, said cutting wheel projecting beyond said frame and being capable of cutting in both said positions, means adjustably mounted in said frame and carrying said wheel-supporting means for finely adjusting the position of said wheel, a splash pan adjustably carried by the first-mentioned means and enclosing a part of said cutting wheel, nozzles supplying water to said cutting wheel in its lower position, and a bracket carried by the second-mentioned means and carrying said nozzles.

FRANK G. POHL.